United States Patent
Stone et al.

(10) Patent No.: US 11,074,453 B2
(45) Date of Patent: Jul. 27, 2021

(54) VIDEO ACTIVE REGION BATCHING

(71) Applicant: Hewlett Packard Enterprise Development LP, Houston, TX (US)

(72) Inventors: Nathaniel Stone, Palo Alto, CA (US); Puneet Jain, Palo Alto, CA (US); Theodore A. Stone, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 56 days.

(21) Appl. No.: 15/884,939

(22) Filed: Jan. 31, 2018

(65) Prior Publication Data

US 2019/0236372 A1 Aug. 1, 2019

(51) Int. Cl.
| | |
|---|---|
| *G06K 9/62* | (2006.01) |
| *G06K 9/00* | (2006.01) |
| *G06T 7/254* | (2017.01) |
| *G06T 1/20* | (2006.01) |
| *G06K 9/32* | (2006.01) |

(52) U.S. Cl.
CPC ....... *G06K 9/00718* (2013.01); *G06K 9/3233* (2013.01); *G06K 9/6271* (2013.01); *G06T 1/20* (2013.01); *G06T 7/254* (2017.01); *G06T 2207/10016* (2013.01); *G06T 2207/20084* (2013.01)

(58) Field of Classification Search
CPC ............. G06K 9/00718; G06K 9/3233; G06K 9/6271; G06T 7/254; G06T 2207/20084; G06T 1/20; G06T 2207/10016
See application file for complete search history.

(56) References Cited

U.S. PATENT DOCUMENTS

| | | | |
|---|---|---|---|
| 8,937,750 B2* | 1/2015 | Ulichney | H04N 1/4052 |
| | | | 358/3.03 |
| 9,349,054 B1 | 5/2016 | Saitwal et al. | |
| 2008/0088631 A1 | 4/2008 | Bakalash et al. | |
| 2012/0127270 A1* | 5/2012 | Zhang | G06T 7/579 |
| | | | 348/43 |

(Continued)

FOREIGN PATENT DOCUMENTS

WO WO-2017074966 5/2017

OTHER PUBLICATIONS

Zhang et al., "Live Video Analytics at Scale with Approximation and Delay-Tolerance" 14th USENIX Symposium on Networked Systems Design and Implementation, 2017, pp. 377-392.

(Continued)

*Primary Examiner* — Solomon G Bezuayehu
(74) *Attorney, Agent, or Firm* — Brooks, Cameron & Huebsch, PLLC

(57) ABSTRACT

An example video analytics device can include a memory, a processor executing instructions stored in the memory, an active region detector to identify a plurality of active regions of a plurality of video streams, wherein the plurality of active regions are sections in the plurality of video streams that change from a first frame to a second frame, and a bin packer communicatively coupled with the processor to combine the plurality of active regions to produce a multi-batch of an individual slice, wherein the multi-batch of the individual slice is a batch including the plurality of active regions that is processed at once.

16 Claims, 3 Drawing Sheets

(56) References Cited

U.S. PATENT DOCUMENTS

| | | | |
|---|---|---|---|
| 2012/0236940 A1 | 9/2012 | Katzur et al. | |
| 2013/0201282 A1* | 8/2013 | Ballocca | H04N 13/161 348/43 |
| 2013/0315474 A1* | 11/2013 | D'Amato | H04N 19/86 382/154 |
| 2015/0178568 A1* | 6/2015 | Shellshear | G06T 7/248 382/103 |
| 2015/0250391 A1* | 9/2015 | Kyal | G06T 7/0012 382/128 |
| 2016/0171311 A1* | 6/2016 | Case | G06K 9/00771 382/103 |
| 2016/0235588 A1* | 8/2016 | Hart | A61F 9/00838 |
| 2016/0360180 A1* | 12/2016 | Cole | H04N 13/161 |
| 2017/0083764 A1 | 3/2017 | Risinger et al. | |
| 2017/0287104 A1* | 10/2017 | Risinger | G06T 1/60 |
| 2018/0033113 A1* | 2/2018 | Dai | G06T 1/0042 |
| 2018/0190377 A1* | 7/2018 | Schneemann | G06N 3/084 |
| 2019/0197362 A1* | 6/2019 | Campanella | G06K 9/4642 |
| 2020/0218959 A1* | 7/2020 | Srinivasa | G06N 3/049 |

OTHER PUBLICATIONS

Wikipedia, "Bin packing problem," available Online at <https://en.wikipedia.org/w/index.php?title=Bin_packing_problem&oldid=795142350>, Aug. 12, 2017, 3 page.

Tomov et al., "High-Performance Batched Computations for GPUs: Approaches and Applications," in GPU Technology Conference, San Jose, CA, 2016, 47 pages.

Ren et al., "Faster R-CNN: Towards Real-Time Object Detection," in Advances in Neural Information Processing Systems, 2015, 9 pages.

Rastegari et al., "XNOR-Net: ImageNet Classification Using Binary Convolutional Neural Networks", Computer Vision—ECCV 2016: 14th European Conference, Amsterdam, The Netherlands, Oct. 11-14, 2016, pp. 525-542.

Mark Harris, "GPU Pro Tip: CUDA 7 Streams Simplify Concurrency", available online at <https://devblogs.nvidia.com/gpu-pro-tip-cuda-7-streams-simplify-concurrency/>, Jan. 22, 2015, 4 pages.

M. Scarpino, "OpenCL in action: how to accelerate graphics and computations.," 2011, 458 pages.

Huynh et al., "DeepMon: Building Mobile GPU Deep Learning Models for Continuous Vision Applications", MobiSys 2017: Proceedings of the 15th Annual International Conference on Mobile Systems, Applications, and Services, 2017, pp. 82-95.

Huang et al., "Densely Connected Convolutional Networks", IEEE Conference on Computer Vision and Pattern Recognition (CVPR), 2017, pp. 4700-4708.

Hillery Hunter, "IBM Research achieves record deep learning performance with new software technology", IBM Research, available online at <https://www.ibm.com/blogs/research/2017/08/distributed-deep-learning/>, Aug. 8, 2017, 5 pages.

Han et al., "Deep Compression: Compressing Deep Neural Networks with Pruning, Trained Quantization and Huffman Coding,", ICLR 2016, 14 pages.

Goyal et al., "Accurate, Large Minibatch SGD: Training ImageNet in 1 Hour", Facebook Research, 2018, 12 pages.

G. Dosa, "The Tight Bound of First Fit Decreasing Bin-Packing Algorithm Is $FFD(I) = 11/9OPT(I) + 6/9$," in Combinatorics, Algorithms, Probabilistic and Experimental Methodologies, 2007, pp. 1-11.

Facebook Research, "Caffe2: A new lightweight, modular, and scalable deep learning framework", available online at <https://web.archive.org/web/20180115232509/https://research.fb.com/downloads/caffe2/>, Jan. 15, 2018, 3 pages.

Courbariaux et al., "BinaryConnect: Training Deep Neural Networks with binary weights during propagations", Proceedings of the 28th International Conference on Neural Information Processing Systems, vol. 2, 2015, pp. 3123-3131.

Chetlur et al., "cudnn: Efficient primitives for deep learning," Neural and Evolutionary Computing, 2014, 9 pages.

Anna et al, "Accelerate Deep Learning Inference with Integrated Intel® Processor Graphics Rev 2.0", published on May 29, 2018, 13 pages.

"TensorFlow", available online at <https://web.archive.org/web/20180125024136/https://www.tensorflow.org/mobile/>, Jan. 25, 2018, 1 pages.

"Pilot AI: Accelerating the AI age", available online at < https://web.archive.org/web/20180131034353/http://pilot.ai/ >, Jan. 31, 2018, 6 pages.

"DeepLearningKit", available online at <https://web.archive.org/web/20171225092016/https://memkite.com/deeplearningkit/>, Dec. 25, 2017, 5 pages.

"Caffe | Deep Learning Framework by BAIR", available online at <https://web.archive.org/web/20180130172636/http://caffe.berkeleyvision.org/>, Jan. 30, 2018, 5 pages.

Real-time Video Analysis Using Microsoft Cognitive Services, Azure Service Bus Queues and Azure Functions, (Web Page), Sep. 27, 2017, 6 Pgs.

Tennoe, M. et al., Efficient Implementation and Processing of a Real-time Panorama Video Pipeline, (Research Paper), Nov. 19, 2013, 8 Pgs.

* cited by examiner

VIDEO ACTIVE REGION BATCHING

BACKGROUND

Video active region batching can be used in processing video streams. Video active region batching can be used in a plurality of applications via a video analytics device. In some examples, video analytics devices can be used to detect, classify, and track objects in real-time. A video analytics device can be hardware used to implement machine learning including convolutional neural networks (CNNs) for deep inference modeling.

DETAILED DESCRIPTION

A video analytics device as described herein can be utilized in a plurality of applications. In some examples, a video analytics device can be used with a graphics processing unit (GPU) for deep inference modeling. The video analytics device can comprise a memory, a processor, an active region detector, and a bin packer. The active region detector can identify active regions of video streams. For example, the active region detector identifies regions on frames of video streams where motion is occurring. The active regions can be sections in the video streams that change from frame to frame. The video streams can be from a plurality of static cameras, for example. The bin packer can combine the active regions to produce a multi-batch. For example, the active region detector can identify regions on frames of video streams where motion is occurring. In some examples, a multi-batch can include an individual slice. A multi-batch of an individual slice can be a batch of active regions that is processed at once.

In some examples, the active region detector can identify the active regions by background subtraction. The background subtraction can include calculating an elementwise difference of pixel intensity values between a first frame of a video stream and second frame of the video stream for each color channel. The active region detector can combine peak values of the elementwise differences for each position into a particular channel. A threshold, an erode, and a dilation operation can be performed by the active region detector on the elementwise difference of the pixel intensity values. The active region detector can identify the plurality of active regions by creating bounding boxes around a particular channel.

The bin packer can combine active regions into a bin to produce a multi-batch. A bin can be a fixed size. The size can be specified by the deep inference model of the GPU. The fixed size can be equal to a peak frame of the video streams. In some examples, the deep inference model can process bins with varying sizes. The size of the bin can be chosen to be within a threshold amount of non-active region space. In some examples, the multi-batch can be combined into an individual slice. The individual slice can include an active region from each of the video streams.

In some examples, positions of active regions on input frames of a video stream from a plurality of sources can be mapped to their positions on a multi-batch of an individual slice. The active regions in the multi-batch can be processed through a deep inference model on a GPU. The results of the deep inference model can be split into a plurality of outputs based on their mapped positions. The outputs can then be sent to their corresponding sources.

Figure 1:
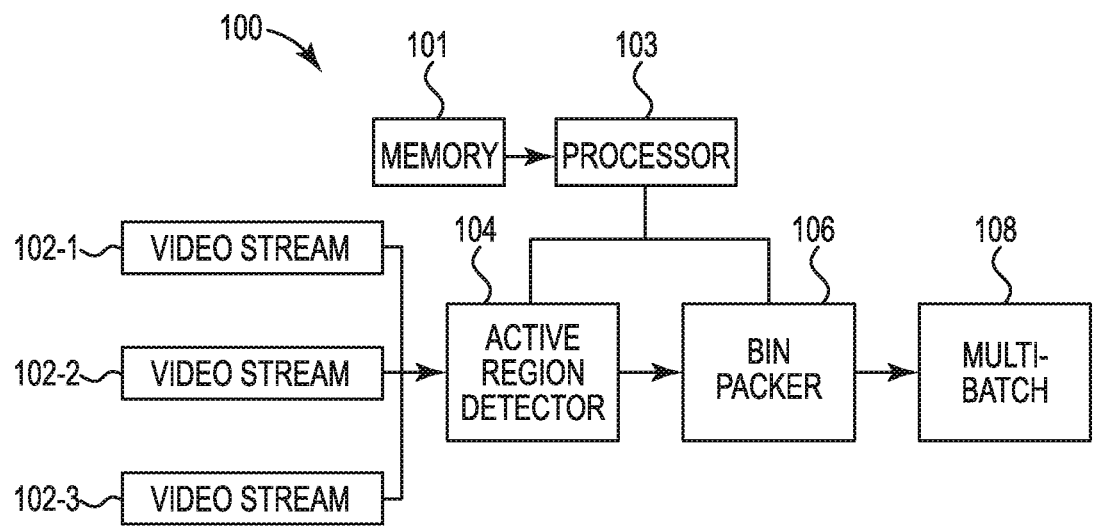
FIG. 1 illustrates an example video analytics device, consistent with the present disclosure.

FIG. 1 illustrates an example video analytics device 100, consistent with the present disclosure. The video analytics device can include a memory 101, a processor 103 to execute non-transitory instructions stored in the memory 101, an active region detector 104 communicatively coupled with the processor 103, and a bin packer 106 communicatively coupled with the processor 103.

The active region detector 104 can receive a plurality of video streams 102-1, 102-2, 102-3. The plurality of video streams 102-1, 102-2, 102-3 can include a plurality of input frames. The positions of the active regions on the plurality of input frames can be mapped.

The active region detector 104 can identify a plurality of active regions of the plurality of video streams 102-1, 102-2, 102-3. The plurality of video streams 102-1, 102-2, 102-3 can be from a plurality of static cameras. In some examples, the plurality of active regions can be sections in the plurality of video streams that change from a first frame to a second frame. The plurality of active regions can be identified by background subtraction since the plurality of video streams come from static cameras. Background subtraction can be performed by calculating an elementwise difference of pixel intensity values between a first frame at a first time and a second frame at a second time for a color channel. Peak values of the elementwise differences can be combined for each position into a particular channel by the active region detector 104. The active region detector 104 can further perform a threshold, an erode, a dilation, or combinations thereof on the elementwise difference of the pixel intensity values. The plurality of active regions can be identified by the active region detector 104 by creating bounding boxes around the particular channel. In some examples, the bounding boxes can be in the form of convex hulls.

The bin packer 106 can receive the plurality of active regions identified by the active region detector 104. The bin packer 106 can combine the plurality of active regions to produce a multi-batch of an individual slice. In some examples, the multi-batch of an individual slice 108 can be a batch including the plurality of active regions that can be processed at once. For example, the multi-batch of the individual slice 108 can comprise an active region from each of the plurality of video streams 102-1, 102-2, and 102-3. The positions of the active regions on the input frames can be mapped with the positions of the active regions on the multi-batch of the individual slice 108. The bin packer 106 can output the multi-batch of an individual slice 108.

In some examples, the video analytics device 100 can include a GPU to process the plurality of active regions. The GPU can receive the multi-batch of the individual slice 108 from the bin packer 106. The GPU can process the plurality of active regions through a deep inference model. In some examples, the bin size can be a fixed bin size specified by the inference model. The fixed bin size can be equal to a peak frame of the plurality of video streams because the entire frame could be an active region. A first fit decreasing approximation algorithm can be used for a fixed bin size. In some examples, the deep inference model of the GPU can accept varying bin sizes. A bin size can be chosen to be within a threshold amount of non-active region space to reduce the amount of space unused in the bin.

Figure 2:
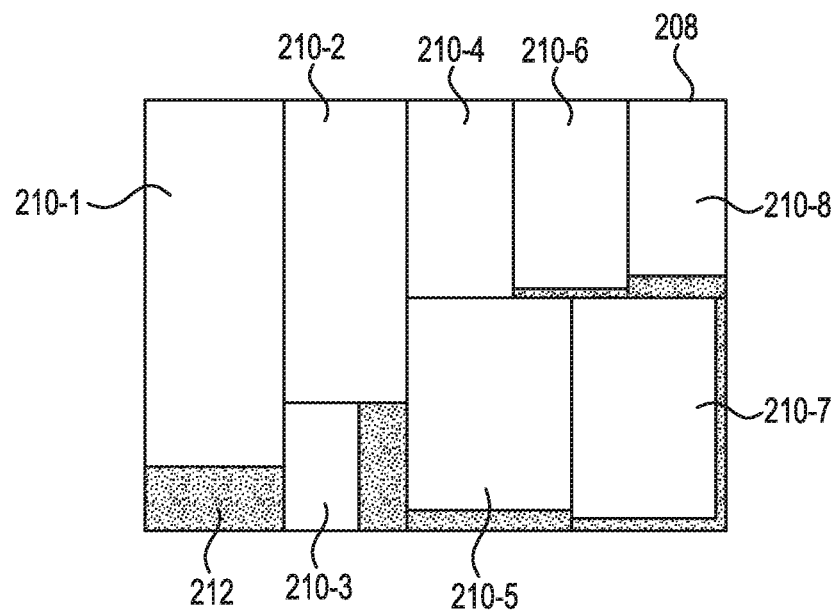
FIG. 2 illustrates an example multi-batch of an individual slice, consistent with the present disclosure.

FIG. 2 illustrates an example multi-batch of an individual slice 208, consistent with the present disclosure. The multi-batch of the individual slice 208 can include a plurality of active regions 210-1, . . . , 210-8 combined by a bin packer (e.g., bin packer 106 in FIG. 1) and non-active space 212.

The multi-batch of the individual slice 208 can be a batch including the plurality of active regions 210-1, . . . , 210-8 that is processed at once. In some examples, a GPU can process the plurality of active regions 210-1, . . . , 210-8 through a deep inference model. The deep inference model can specify a fixed bin size and/or accept varying bin sizes. In some examples, a bin size is chosen to be within a threshold amount of non-active space 212. Varying bin sizes may not have a peak size, so the plurality of active regions 210-1, . . . , 210-8 can be included in a bin, known as a multi-batch of an individual slice 208.

In some examples, the positions of the plurality of active regions 210-1, . . . , 210-8 can be mapped on the multi-batch of the individual slice 208. The mapped positions of the plurality of active regions 210-1, . . . , 210-8 on the multi-batch of the individual slice 208 can correspond to their positions on input frames of the plurality of video streams 102-1, 102-2, 102-3.

Figure 3:
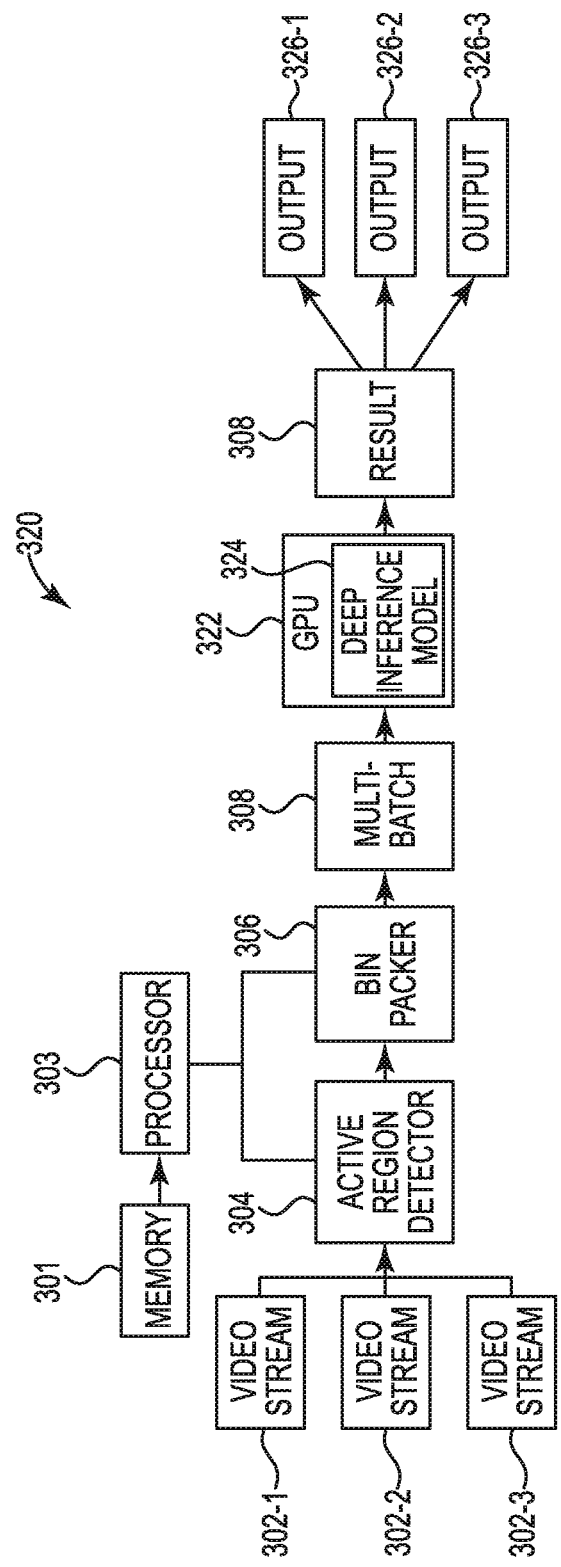
FIG. 3 illustrates an example video analytics system, consistent with the present disclosure.

FIG. 3 illustrates an example video analytics system 320, consistent with the present disclosure. The video analytics system 320 can include a memory 301, a processor 303, an active region detector 304, a bin packer 306, and a GPU 322.

The processor 303 can execute non-transitory instructions stored in the memory 301. The active region detector 304 can be communicatively coupled with the processor 303. In some examples, the active region detector 304 can receive a plurality of video streams 302-1, 302-2, 302-3 from a plurality of sources. The active region detector 304 can identify a plurality of active regions (e.g., active regions 210-1, . . . , 210-8 in FIG. 2) from the plurality of video streams 302-1, 302-2, 302-3. In some examples, the plurality of active regions can be sections in the plurality of video streams 302-1, 302-2, 302-3 that change from a first frame to a second frame.

The bin packer 306 can be communicatively coupled with the processor 303. The bin packer 306 can receive the plurality of active regions (e.g., active regions 210-1, . . . , 210-8 in FIG. 2) from the active region detector 304. The bin packer 306 can combine the plurality of active regions into a bin to produce a multi-batch of an individual slice 308. A multi-batch of an individual slice 308 is a batch of active regions that can be processed at once.

The GPU 322 can receive the multi-batch of the individual slice 308 from the bin packer 306. The GPU 322 can process the multi-batch of the individual slice 308 using deep inference model 324. In some examples, the multi-batch of the individual slice 308 can be processed through a deep inference model 324. The result 308 of the deep inference model 324 can be split into a plurality of outputs 326-1, 326-2, 326-3. The plurality of outputs 326-1, 326-2, 326-3 can be sent to the plurality of sources the plurality of video streams 302-1, 302-2, 302-3 came from. In some examples, the GPU 322 can store deep inference model results 308 from a first frame that do not intersect with an active region of a second frame to prevent a video stream of the plurality of video streams 302-1, 302-2, 302-3 from missing a frame. In some examples, the deep inference model 324 can include a feature extraction by alternating convolution and activation function layers.

Figure 4:
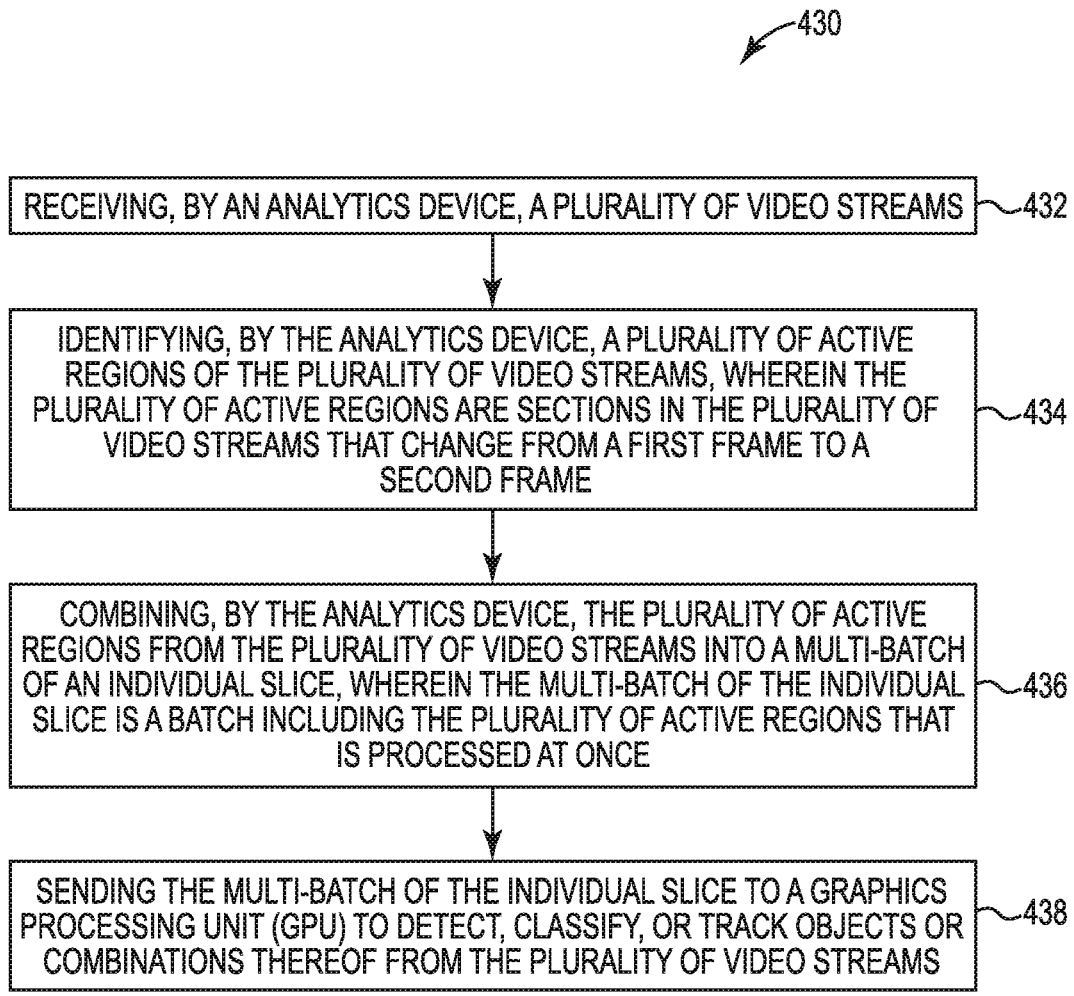
FIG. 4 is a flowchart illustrating a method to identify, combine, and process a plurality of active regions, consistent with the present disclosure.

FIG. 4 is a flowchart illustrating a method 430 to identify, combine, and process a plurality of active regions, consistent with the present disclosure. For example, the method 430 can be performed by a video analytics system (e.g., video analytics system 320 in FIG. 3).

At 432, the method 430 includes a video analytics device (e.g., video analytics device 100 in FIG. 1) receiving a plurality of video streams (e.g., video streams 302-1, 302-2, 302-3 in FIG. 3). The video streams can come from a plurality of sources. In some examples, the plurality of sources can be a plurality of static cameras.

In some examples, the video analytics device (e.g., video analytics device 100 in FIG. 1) can be used to detect, classify, and track objects in real-time. The video analytics device can be hardware used to implement machine learning. Machine learning can include convolutional neural networks (CNNs) for deep inference modeling.

The video analytics device (e.g., video analytics device 100 in FIG. 1) can comprise a memory (e.g., memory 101 in FIG. 1), a processor (e.g., processor 103 in FIG. 1), an active region detector (e.g., active region detector 104 in FIG. 1), and a bin packer (e.g., bin packer 106 in FIG. 1).

At 434, the method 430 includes a video analytics device (e.g., video analytics device 100 in FIG. 1) identifying a plurality of active regions (e.g., active regions 210-1, . . . , 210-8 in FIG. 2) of the plurality of video streams (e.g., video streams 302-1, 302-2, 302-3 in FIG. 3). In some examples the plurality of active regions can be sections in the plurality of video streams that change from a first frame to a second frame.

In some examples, the active regions (e.g., active regions 210-1, . . . , 210-8 in FIG. 2) can be identified by an active region detector (e.g., active region detector 104 in FIG. 1). The active region detector can identify the active regions by background subtraction. The background subtraction can include calculating an elementwise difference of pixel intensity values between a first frame of a video stream and second frame of the video stream for each color channel. The active region detector can combine peak values of the elementwise differences for each position into a particular channel. A threshold, an erode, and a dilation operation can be performed by the active region detector on the elementwise difference of the pixel intensity values. The active region detector can identify the plurality of active regions by creating bounding boxes around the particular channel.

At 436, the method 430 includes a video analytics device (e.g., video analytics device 100 in FIG. 1) combining the plurality of active regions (e.g., active regions 210-1, . . . , 210-8 in FIG. 2) from the plurality of video streams (e.g., video streams 302-1, 302-2, 302-3 in FIG. 3) into a multi-batch of an individual slice (e.g., multi-batch of an individual slice 308 in FIG. 3). In some examples, the multi-batch of the individual slice is a batch including the plurality of active regions that is processed at once.

In some examples, the plurality of active regions (e.g., active regions 210-1, . . . , 210-8 in FIG. 2) can be combined from the plurality of video streams (e.g., video streams 302-1, 302-2, 302-3 in FIG. 3) into a multi-batch of an individual slice (e.g., multi-batch of an individual slice 308 in FIG. 3) using a bin packer (e.g., bin packer 106 in FIG. 1). The bin packer can receive the plurality of active regions from the active region detector (e.g., active region detector 104 in FIG. 1).

The bin and/or the multi-batch of an individual slice (e.g., multi-batch of an individual slice 308 in FIG. 3) can be a fixed size. The size can be specified by a deep inference model (e.g., deep inference model 324 in FIG. 3) of a GPU (e.g., GPU 322 in FIG. 3). The fixed size can be equal to a peak frame of the video streams (e.g., video streams 302-1, 302-2, 302-3 in FIG. 3).

In some examples, the deep inference model (e.g., deep inference model 324 in FIG. 3) can process bins with varying sizes. The size of the bin can be chosen to be within a threshold amount of non-active region space (e.g. non-active region space 212 in FIG. 2). In some examples, the multi-batch of the individual slice (e.g. multi-batch of an individual slice 308 in FIG. 3) can include an active region from each of the video streams (e.g. video streams 302-1, 302-2, 302-3 in FIG. 3).

At 438, the method 430 includes sending the multi-batch of the individual slice (e.g., multi-batch of an individual slice 308 in FIG. 3) to a GPU (e.g., GPU 322 in FIG. 3). The GPU can receive the multi-batch of the individual slice from the bin packer (e.g., bin packer 106 in FIG. 1). The multi-batch of the individual slice including the plurality of active regions (e.g., active regions 210-1, . . . , 210-8 in FIG. 2) can be processed through a deep inference model (e.g., deep inference model 324 in FIG. 3) on the GPU. The GPU can produce a result (e.g., result 308 in FIG. 3).

In some examples, positions of active regions (e.g., active regions 210-1, . . . , 210-8 in FIG. 2) on input frames of the plurality of video streams (e.g., video streams 302-1, 302-2, 302-3 in FIG. 3) can be mapped to their positions on the multi-batch of the individual slice (e.g., multi-batch of an individual slice 308 in FIG. 3). The result (e.g., result 308 in FIG. 3) of the deep inference model (e.g., deep inference model 324 in FIG. 3) can be split into a plurality of outputs (e.g., outputs 326-1, 326-2, 326-3 in FIG. 3) based on the mapped positions. The outputs can then be sent to their corresponding video streams and/or sources.

In some examples, the GPU (e.g., GPU 322 in FIG. 3) can store deep inference model results 308 from a first frame that do not intersect with an active region of a second frame to prevent a video stream of the plurality of video streams (e.g., video streams 302-1, 302-2, 302-3 in FIG. 3) from missing a frame. In some examples, the deep inference model (e.g., deep inference model 324 in FIG. 3) can include a feature extraction by alternating convolution and activation function layers.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, can indicate that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A video analytics device, comprising:
   a memory;
   a processor executing instructions stored in the memory;
   an active region detector communicatively coupled with the processor to identify a plurality of active regions of a plurality of video streams by background subtraction comprising calculating an elementwise difference of pixel intensity values between a first frame at a first time and a second frame at a second time for a color channel, wherein the plurality of active regions are sections in the plurality of video streams that change from a first frame to a second frame; and
   a bin packer communicatively coupled with the processor to combine the plurality of active regions to produce a multi-batch of an individual slice, wherein the multi-batch of the individual slice is a batch including the plurality of active regions that is processed at once, a result of the processing being split into a plurality of outputs that are sent to a plurality of respective sources of the plurality of video streams.

2. The video analytics device of claim 1, wherein the video analytics device comprises a graphics processing unit (GPU) to process the plurality of active regions.

3. The video analytics device of claim 1, wherein the active region detector combines peak values of the elementwise differences for each position into a particular channel.

4. The video analytics device of claim 3, wherein the active region detector performs a threshold, an erode, a dilation, or combinations thereof on the elementwise difference of the pixel intensity values.

5. The video analytics device of claim 1, wherein the active region detector identifies the plurality of active regions by creating bounding boxes around a particular channel.

6. A video analytics system, comprising:
   a memory;
   a processor executing instructions stored in the memory;
   an active region detector communicatively coupled with the processor to identify a plurality of active regions of a plurality of video streams by background subtraction comprising calculating an elementwise difference of pixel intensity values between a first frame at a first time and a second frame at a second time for a color channel, wherein the plurality of active regions are sections in the plurality of video streams that change from the first frame to the second frame;
   a bin packer communicatively coupled with the processor to combine the plurality of active regions into a bin to produce a multi-batch of an individual slice, wherein the multi-batch of the individual slice is a batch including the plurality of active regions that is processed at once;
   a graphics processing unit (GPU) to process the plurality of active regions through a deep inference model to detect, classify, or track objects or combinations thereof from the plurality of video streams, split a result of the deep inference model into a plurality of outputs, and send the outputs to a plurality of respective sources of the plurality of video streams.

7. The video analytics system of claim 6, wherein the bin is a fixed size as specified by the deep inference model.

8. The video analytics system of claim 7, wherein the fixed size is equal to a peak frame of the plurality of video streams.

9. The video analytics system of claim 6, wherein the deep inference model accepts varying bin sizes.

10. The video analytics system of claim 6, wherein the plurality of video streams are from a plurality of static cameras.

11. The video analytics system of claim 6, wherein a size of the bin is chosen to be within a threshold amount of non-active region space.

12. The video analytics system of claim 6, wherein the individual slice comprises an active region from each of the plurality of video streams.

13. A method, comprising:
receiving, by an analytics device, a plurality of video streams;
identifying, by the analytics device, a plurality of active regions of the plurality of video streams by background subtraction comprising calculating an elementwise difference of pixel intensity values between a first frame at a first time and a second frame at a second time for a color channel, wherein the plurality of active regions are sections in the plurality of video streams that change from the first frame to the second frame;
combining, by the analytics device, the plurality of active regions from the plurality of video streams into a multi-batch of an individual slice, wherein the multi-batch of the individual slice is a batch including the plurality of active regions that is processed at once; and
sending the multi-batch of the individual slice to a graphics processing unit (GPU) to detect, classify, or track objects or combinations thereof from the plurality of video streams;
processing the multi-batch of the individual slice through a deep inference model on the GPU; and
splitting a result of the deep inference model into a plurality of outputs and sending the outputs to a plurality of respective sources of the plurality of video streams.

14. The method of claim 13, wherein the method further includes mapping a plurality of positions of the plurality of active regions on a plurality of input frames to the plurality of positions of the plurality of active regions on the multi-batch of the individual slice.

15. The method of claim 13, wherein the method further includes the GPU storing deep inference model results from a first frame that do not intersect with an active region of a second frame.

16. The method of claim 13, wherein the deep inference model includes a feature extraction by alternating convolution and activation function layers.

* * * * *